United States Patent
Kitajima (10) Patent No.: US 6,983,905 B2
(45) Date of Patent: Jan. 10, 2006

(54) FISHING REEL SCREW OPERATION STRUCTURE

(75) Inventor: Keigo Kitajima, Sakai (JP)

(73) Assignee: Shimano, Inc., Osaka (JP)

( * ) Notice: Subject to any disclaimer, the term of this patent is extended or adjusted under 35 U.S.C. 154(b) by 19 days.

(21) Appl. No.: 10/692,726

(22) Filed: Oct. 27, 2003

(65) Prior Publication Data

US 2004/0113005 A1    Jun. 17, 2004

(30) Foreign Application Priority Data

Nov. 21, 2002    (JP) .............................. 2002-338463

(51) Int. Cl.
*A01K 89/02* (2006.01)

(52) U.S. Cl. .................................................. 242/245
(58) Field of Classification Search ................ 242/244, 242/245, 246, 302, 303, 304
See application file for complete search history.

(56) References Cited

U.S. PATENT DOCUMENTS

| | | | |
|---|---|---|---|
| 4,577,808 A | | 3/1986 | Kawabe |
| 4,901,944 A | | 2/1990 | Aoki |
| 4,988,057 A | | 1/1991 | Hitomi |
| 5,100,079 A | * | 3/1992 | Toda ........................... 242/245 |
| 5,259,565 A | * | 11/1993 | Hitomi ........................ 242/245 |
| 5,556,049 A | * | 9/1996 | Bennett et al. ............. 242/295 |
| 5,626,303 A | * | 5/1997 | Bringsen ..................... 242/265 |
| 5,918,826 A | * | 7/1999 | Arkowski .................... 242/295 |
| 5,947,400 A | * | 9/1999 | Tsutsumi .................... 242/322 |
| 6,641,069 B2 | * | 11/2003 | Katayama et al. .......... 242/246 |
| 6,726,137 B1 | * | 4/2004 | Li ............................... 242/238 |

* cited by examiner

*Primary Examiner*—Emmanuel Marcelo
(74) *Attorney, Agent, or Firm*—Shinjyu Global IP Counselors, LLP (57) ABSTRACT

A screw operation structure includes a screw-in portion that is capable of being mounted to a rear portion of a reel unit, a screw member, and an operation member. The screw-in portion includes an outer threaded portion, and a tubular portion that is integrally formed with the outer threaded portion. The tubular portion is formed such that the diameter thereof is larger than the inner diameter of the inner threaded portion of the screw member. In this configuration, the screw member is prevented from falling off of the screw-in portion by the tubular portion of the screw-in portion, which has a diameter that is larger than the inner diameter of the inner threaded portion of the screw member. In this manner, it is easy to mount an the operation member and the screw member in the reel unit.

16 Claims, 6 Drawing Sheets

FISHING REEL SCREW OPERATION STRUCTURE

BACKGROUND OF THE INVENTION

1. Field of the Invention

This invention generally relates to a fishing reel screw operation structure. More specifically, the present invention relates to a fishing reel screw operation structure that is attached to a reel unit of a fishing reel.

2. Background Information

A screw operation structure is widely used in conventional fishing reels in order to make various mechanisms installed in a reel unit of the fishing reel adjustable. One example of this type of screw operation structure is one that serves to adjust the drag force of a rear drag mechanism on a rear drag type spinning reel.

The screw operation structure employed in the rear drag mechanism of a conventional spinning reel includes a screw-in portion, a closed-end cylindrical operation knob, a pushing member, and an attachment bolt. The screw-in portion includes a threaded portion that is formed on the rear portion of the reel unit. The operation knob can be screwed onto the threaded portion. The pushing member pushes the rear drag mechanism, and the attachment bolt attaches the operation knob to the pushing member. In this configuration, when the operation knob falls off of the screw-in portion, the pushing member that is attached to the operation knob will fall off, and problems such as the rear drag mechanism becoming disassembled will occur. Because of this, a retaining member is mounted to the screw-in portion of a conventional spinning reel so that the pushing member will not fall off of the screw-in portion. The retaining member is, for example, a semi-circular spring member, and both ends thereof pass through the screw-in portion to engage with the pushing member. Thus, the operation knob fixed to the pushing member will also not fall off of the reel unit because the pushing member is retained such that it will not fall off from the rear of the screw-in portion due to the retaining member being mounted to the screw-in portion.

In conventional screw operation structures as those shown in Japanese Utility Model No. S60-168375 (FIGS. 1 and 6), the push member is mounted to the rear portion of the rear drag mechanism attached to the reel unit. Next, the retaining member is mounted to the screw-in portion to retain the pushing member. Finally, with the operation knob screwed onto the screw-in portion, the operation knob is fixed to the pushing member by the attachment bolt.

In this conventional structure, in order to attach the operation knob to the reel unit, the retaining member must be mounted to the screw-in portion to retain the pushing member before fixing the operation knob to the pushing member with the attachment bolt. However, there are limitations on the shape and the position of the retaining member because the complex rear drag mechanism is disposed on the rear portion of the reel unit and only a limited amount of space is provided. These limitations with respect to the retaining member complicate the screw operation structure and the task of assembling the same.

In view of the above, there exists a need for a screw operation structure which overcomes the above mentioned problems in the prior art. This invention addresses this need in the prior art as well as other needs, which will become apparent to those skilled in the art from this disclosure.

SUMMARY OF THE INVENTION

A purpose of the present invention is to make it easy to mount the operation knob (the operation member and the screw member) of the screw operation structure and to prevent the operation knob from falling off therefrom.

A fishing reel screw operation structure according to the first aspect of the present invention is adapted to be attached to a reel unit of the fishing reel, and includes a screw-in portion and a screw member. The screw-in portion includes a threaded portion, and a tubular portion that is integrally formed with the threaded portion. The screw-in portion is adapted to be mounted on the reel unit. The screw member is formed into a tubular shape, and has a threaded portion on the inner peripheral surface thereof. The threaded portion of the screw member is configured to be screwed onto the threaded portion of the screw-in portion. Here, the tubular portion of the screw-in portion is formed such that its diameter is larger than the inner diameter of the threaded portion of the screw member. In this screw operation structure, the screw-in portion is mounted on the reel unit after the screw member is mounted on the screw-in portion. Then, the mechanisms installed on the reel body will operate by rotating the screw member. With this configuration, the screw member is prevented from falling off of the screw-in portion due to the tubular portion having a diameter larger than the inner diameter of the threaded portion.

Here, because the screw-in portion is capable of being mounted on the reel unit, the screw member can be easily mounted on the screw-in portion from the threaded portion before the screw-in portion is mounted on the reel unit. In addition, even in situations in which a plurality of mechanisms are disposed on the screw-in portion, both the mechanisms and the screw member can be easily mounted on the reel body by attaching the mechanisms to the screw-in portion in advance and linking them to the screw member. On the other hand, because the tubular portion of the screw-in portion has a diameter that is larger than the inner diameter of the threaded portion of the screw member, the screw member will be prevented from falling off of the screw-in portion by the tubular portion even when the screw member mounted on the threaded portion of the screw-in portion is rotated. Because of this, the screw member can be made so that it does not need a retaining member to prevent the screw member from falling off of the screw-in portion.

The fishing reel screw operation structure according to the second aspect of the present invention is the screw operation structure disclosed in the first aspect, which further includes an operation member that is non-rotatably mounted to the outer peripheral surface of the screw member. Here, because the screw operation structure further includes an operation member, the operability of the screw operation structure will not only improve, but the screw-in portion can also be protected. In addition, after the screw member is attached to the screw-in portion, the task of attaching the operation member will be made easier because the operation member is mounted to the screw member.

The fishing reel screw operation structure according to the third aspect of the present invention is the screw operation structure disclosed in the second aspect, in which the diameter of the screw member is larger than the outer diameter of the tubular member. Here, the operation member can be easily mounted on the screw member from the tubular member side thereof.

The fishing reel screw operation structure according to the fourth aspect of the present invention is the screw operation structure disclosed in the second or third aspect, in which the screw member includes a projection that projects in the radial direction toward a mounting surface of the operation member, and the operation member includes a recessed portion that engages with the projection, such that the recessed portion engages with the projection of the screw member and the operation member rotates together with the screw member. Here, because the operation member rotates together with the screw member when the projection and the recessed portion are engaged with each other, operations performed on the operation member can be efficiently transmitted to the screw member. In addition, by making it possible for the projection on the screw member to engage with the recessed portion of the operation member, the operation member can be easily positioned and mounted on the screw member.

The fishing reel screw operation structure according to the fifth aspect of the present invention is the screw operation structure disclosed in the first aspect, which further includes an operation member that is integrally formed with the screw member and includes a lever that projects from the outer peripheral surface of the screw member in the radial direction. Here, because the operation member is formed integrally with the screw member, the operation member can be mounted to the screw-in portion from the threaded portion side of the screw-in portion without using the screw member. The operation member can be easily mounted to the screw-in portion by using the lever to position the operation member with respect to the screw-in portion. In addition, because the lever of the operation portion projects outward in the radial direction, the operability of the screw operation structure can be improved.

The fishing reel screw operation structure according to the sixth aspect of the present invention is the screw operation structure disclosed in any of the second through fourth aspects, wherein the operational member is a closed-end cylindrical member. Here, because the screw operation structure further includes a closed-end cylindrical operation member, the operability of the screw operation structure will not only improve, but the screw-in portion can also be protected. In addition, after the screw member is attached to the screw-in portion, the task of attaching the operation member will be made easier because the closed-end cylindrical operation member is mounted to the screw member.

The fishing reel screw operation structure according to seventh aspect of the present invention is the screw operation structure disclosed in any of the second through sixth aspects, in which the screw-in portion is capable of being mounted so that it projects toward the rear portion of the reel unit of the spinning reel, and the operation member is an operation knob for the rear drag mechanism of the spinning reel. Here, because the screw-in portion is configured to be mounted on the rear portion of the reel unit of the spinning reel, and the operation member is an operation knob for the rear drag mechanism of the spinning reel, both the rear drag mechanism and the screw operation structure can be easily mounted on the reel body by attaching the rear drag mechanism to the screw-in portion in advance and linking them to the operation knob.

The fishing reel screw operation structure according to the eighth aspect of the present invention is the screw operation structure disclosed in any of the second through sixth aspects, in which the screw-in portion is configured to be mounted so that it projects toward a side portion of the reel unit of a dual bearing reel, and the operation member is an operation knob for a casting control mechanism of the dual bearing reel. Here, because the screw-in portion is configured to be mounted on the side portion of the reel unit of a dual bearing reel, and the operation member is an operation knob for the casting control mechanism of the dual bearing reel, both the casting control mechanism and the screw operation structure can be easily mounted on the reel body by attaching the casting control mechanism to the screw-in portion in advance and linking them to the operation knob.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Configuration of the Reel Unit and Screw Operation Structure

Figure 1:
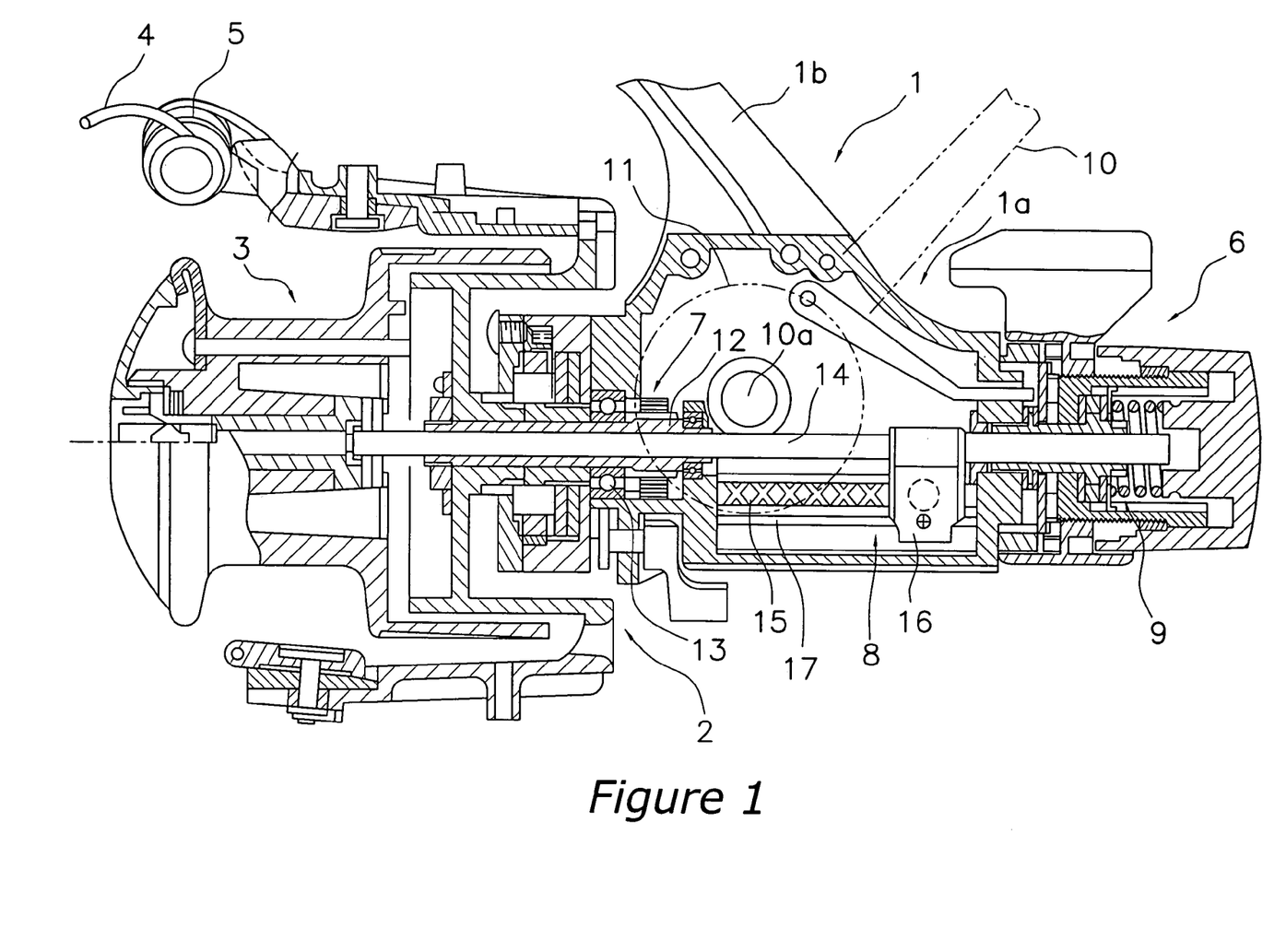
FIG. 1 is a cross-sectional view of a spinning reel according to a first embodiment of the present invention.

FIG. 1 shows a spinning reel in which a first embodiment of the present invention is adopted. The spinning reel includes a reel unit 1 having a handle 10, a rotor 2 rotatively supported on the front of the reel unit 1, and a spool 3 disposed on the front of the rotor 2 and around which fishing line is wound. Here, a bail 4 for winding fishing line is installed on the spool 3, and a line roller 5 that guides fishing line is installed on the bail 4.

As shown in FIG. 1, the reel unit 1 includes a body 1a, and a rod attachment portion 1b that is for attaching the spinning reel to a fishing rod and is formed on the upper portion of the body 1a. A rotor drive mechanism 7 for rotating the rotor 2, and a level wind drive mechanism 8 for uniformly winding fishing line evenly onto the spool 3 by moving the spool 3 back and forth along the rotational center of the rotor 2, are provided in the interior of the body 1a. The rear portion of the body 1a has a rear drag mechanism 9 disposed therein. A screw operation structure 6 is mounted in the rear portion of the body 1a, and serves to operate the rear drag mechanism 9.

As shown in FIG. 1, the rotor drive mechanism 7 includes a master gear 11 that rotates together with a handle shaft 10, and a pinion gear 12 that meshes with the master gear 11. The pinion gear 12 is formed into a tube shape, and a front portion thereof extends toward the spool 3 and passes through the center of the rotor 2. The pinion gear 12 is rotatively supported by ball bearings 13 that are supported by the body 1a. A spool shaft 14 passes through the central portion of the pinion gear 12, and slides forward and backward along the rotational axis of the pinion gear 12. A predetermined gap is maintained between the inner diameter of the pinion gear 12 and the outer diameter of the spool shaft 14. The rotor drive mechanism 7 is a conventional component that is well known in the art. Accordingly, its structure will not be discussed or illustrated in detail herein.

As shown in FIG. 1, the level wind drive mechanism 8 moves the spool shaft 14 forward and backward when the handle shaft 10a is rotated by the handle 10. The level wind drive mechanism 8 includes a drive shaft 15 disposed on the lower inner side of the spool shaft 14, a slider 16 that moves forward and backward along the drive shaft 15, a guide shaft 17 that is disposed below the drive shaft 15, and an intermediate gear (not shown in the figures) that is disposed on one end of the drive shaft 15 and meshes with the pinion gear 12. The drive shaft 15 and the guide shaft 17 are disposed parallel with the spool shaft 14. The level wind mechanism 8 is a conventional component that is well known in the art. Accordingly, its structure will not be discussed or illustrated in detail herein.

Figure 2:
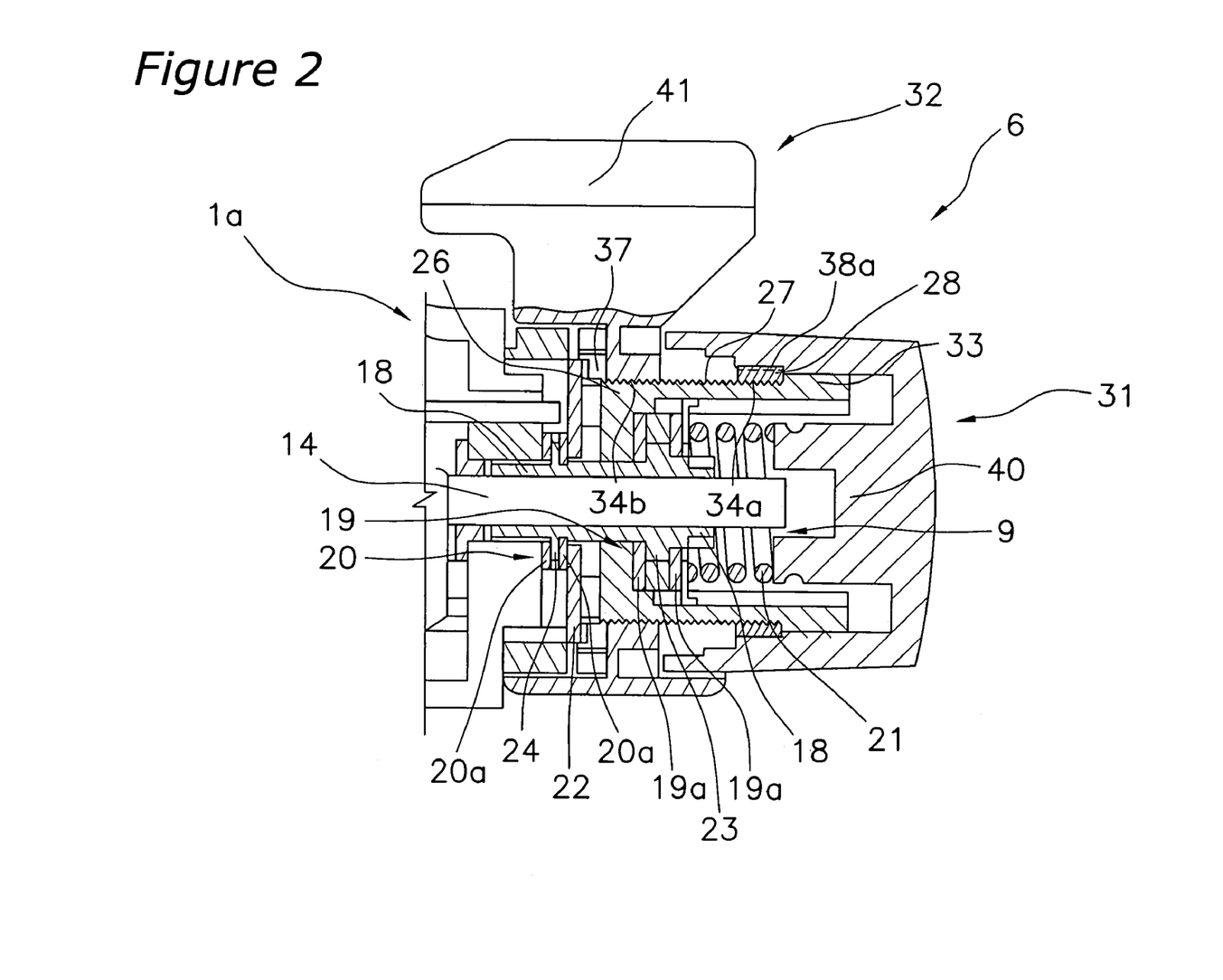
FIG. 2 is an enlarged cross-sectional view of a screw operation structure of the spinning reel according to a first embodiment of the present invention.

As shown in FIG. 2, the rear drag mechanism 9 is composed of a cylindrical bush 18, first and second friction engagement portions 19, 20 that include a plurality of friction plates 19a, 20a, a coil spring 21 disposed on an outer periphery of said spool shaft 14 for urging the friction plates 19a of the first friction engagement portion 19, and a pushing member 22 for urging the second friction plates 20a. The bush 18 is inserted over the outer periphery of the rear portion of the spool shaft 14. The spool shaft 14 is non-rotatable and non-slidable with respect to the bush 18. A first flange portion 23 is provided on the upper peripheral surface of the rear portion of the bush 18, and a second flange portion 24 is provided on the upper peripheral surface of the front portion of the bush 18. The friction plates 19a, 20a of the first and second friction engagement portions 19, 20 are respectively disposed on both sides of the first and second flange portions 23, 24. The coil spring 21 is disposed on the rear portion of the first friction engagement portion 19, and the pushing member 22 is disposed on the rear portion of the second friction engagement portion 20. The rear drag mechanism 9 is a conventional component that is well known in the art. Accordingly, its structure will not be discussed or illustrated in detail herein.

Figure 3:
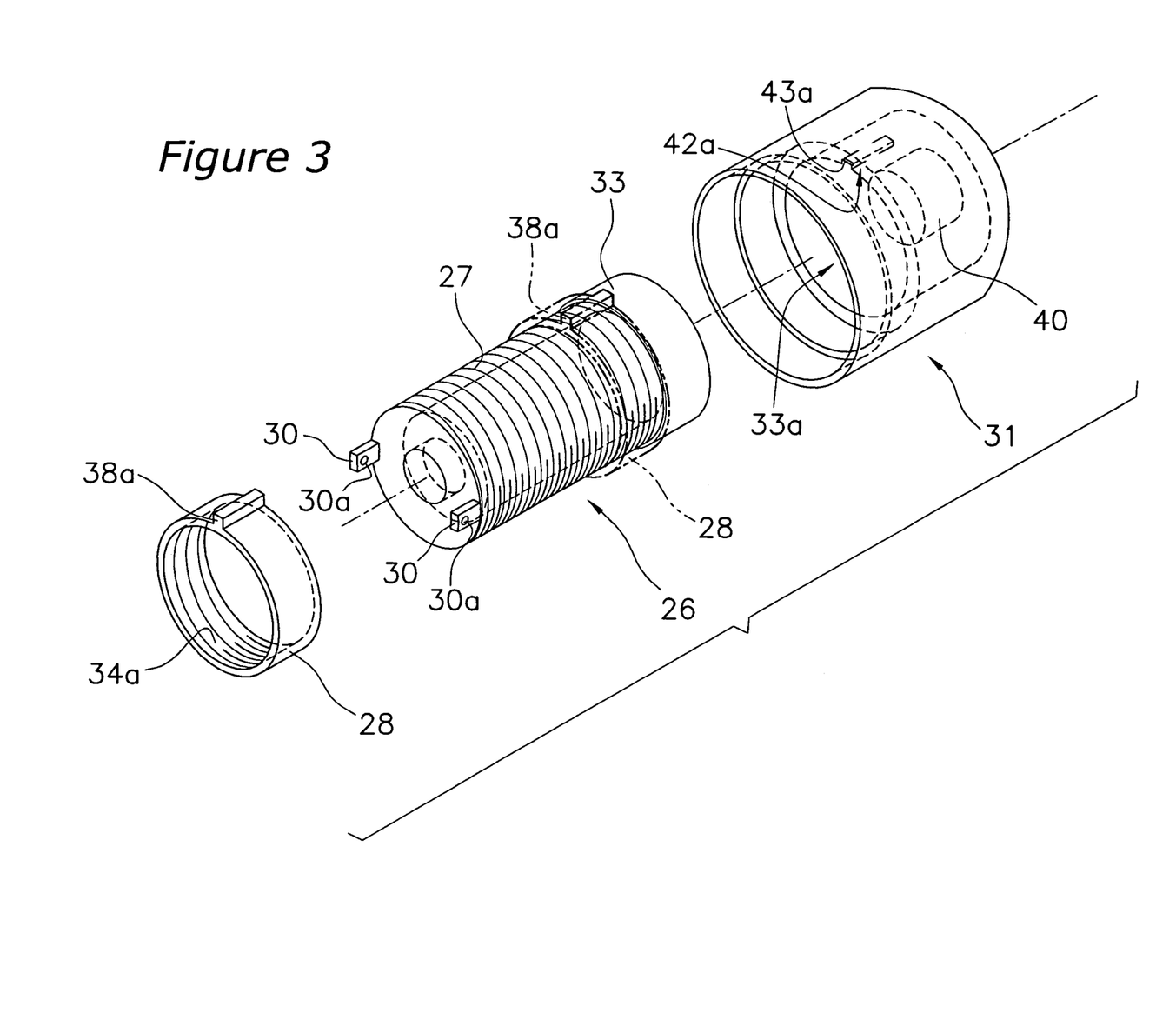
FIG. 3 is an exploded perspective view of the screw operation structure (first operation member) according to a first embodiment of the present invention.
Figure 4:
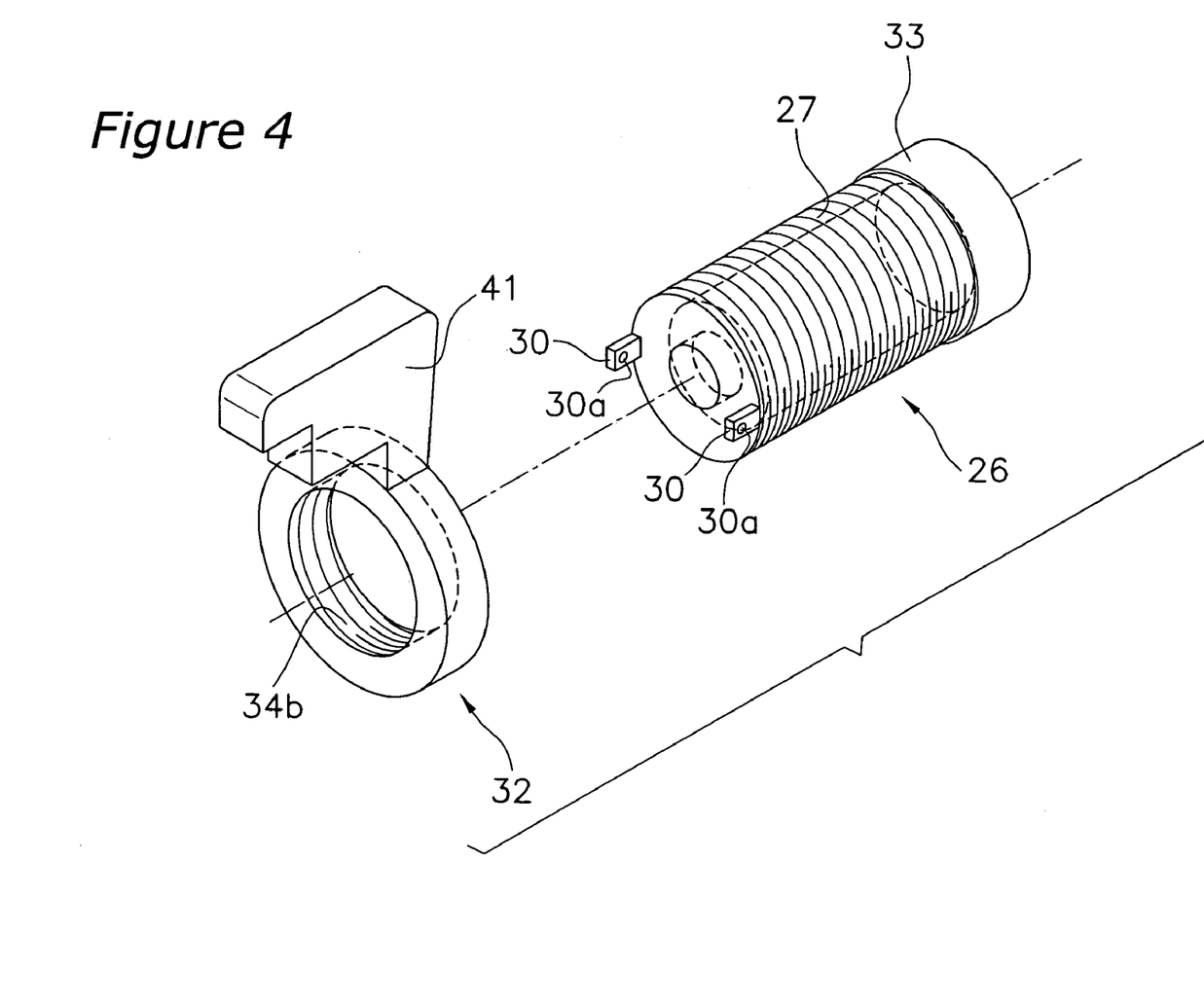
FIG. 4 is an exploded perspective view of the screw operation structure (second operation member) according to a first embodiment of the present invention.

As shown in FIG. 2, the screw operation structure 6 includes a screw-in portion 26 that is disposed on the lower portion of the body 1 a of the reel unit 1, a first screw member 28, and first and second operation members 31, 32. As shown in FIGS. 3 and 4, the screw-in portion 26 includes an outer threaded portion 27, and a tubular portion 33 that is integrally formed with the outer threaded portion 27. Projections 30 that project along the central axis of the outer threaded portion 27 are provided on the outer threaded portion 27 of the screw-in portion 26. Bolt holes 30a for mounting the screw-in portion 26 to the body 1a of the reel unit 1 are formed in the projections 30. As shown in FIGS. 2 and 3, an inner threaded portion 34a that can be screwed onto the outer threaded portion 27 of the screw-in portion 26 is provided on the inner peripheral surface of the first screw member 28. The first screw member 28 is screwed onto the rear side of the outer threaded portion 27. In addition, the outer shape of the first threaded portion 28 is formed with a diameter that is larger than the outer shape of the tubular portion 33. The projection 38a projects radially outward, and is arranged on the outer periphery of the first screw member 28. The tubular portion 33 is formed such that the diameter thereof is larger than the inner diameter of the inner threaded portion 34a of the first screw member 28.

The first operation member 31 is used to finely adjust the drag force of the drag mechanism 9. As shown in FIGS. 2 and 3, the first operation member 31 is formed into a closed-end tubular shape, and includes an accommodation portion 33a that can accommodate the tubular portion 33. The first operation member 31 is mounted on the first screw member 28 that is screwed onto the outer threaded portion 27 of the screw-in portion 26. A pushing portion 40 is integrally formed with the floor of the accommodation portion 33a. The pushing portion 40 is linked in series with the coil spring 21 mounted on the rear portion of the first friction engagement portion 19. A recessed portion 42a is formed in the cylindrical inner peripheral surface of the first operation member 31. The projection 38a of the first screw member 28 can be fitted into the recessed portion 42a. After the projection 38a is fitted into the recessed portion 42a, a control member 43a is formed in the bottom of the recessed portion 42a so that the projection 38a will not come out from the recessed portion 42a. The control portion 43a is composed of a projection that projects from the bottom portion of the recessed portion 42a toward the center of the first screw member 28.

The second operation member 32 is used to adjust the drag force of the drag mechanism 9 in a range that is wider than that of the first operation member 31. As shown in FIGS. 2 and 4, the second operation member 32 is formed into a cylindrical shape. An inner threaded portion 34b is provided on the inner peripheral surface of the second operation member 32. The inner threaded portion 34b is screwed onto the outer threaded portion 27 of the screw-in portion 26 on the front of the first operation member 31. In addition, the second operation member 32 has a lever 41 that projects in the radial direction in its outer peripheral portion. An engagement portion 37, which serves to transmit the movement of the second operation member 32 to the pushing member 22 by engaging non-rotatably and axially movably with the pushing member 22, is disposed between the second operation member 32 and the pushing member 22.

Operation of the Reel Unit and Screw Operation Structure

The bail 4 is pushed over to the line releasing side when fishing line is to be reeled out from the reel unit 1. Then, when the fishing rod is cast, fishing line is paid out from the spool 3. The bail 4 returns to the line-winding side when the fishing line is reeled in. When the handle 10 is rotated in the line winding direction while the bail 4 is in the line-winding state, this rotational force is transmitted to the pinion gear 12 via the handle shaft 10 and the master gear 11. The rotational force transmitted to the pinion gear 12 rotates the rotor 2 on the front portion of the pinion gear 12. In addition, the rotational force transmitted to the pinion gear 12 rotates the drive shaft 15 via the intermediate gear (not shown in the figures) that is meshed with the pinion gear 12. When this occurs, the slider 16 that meshes with the spiral grooves of the drive shaft 15 is guided by the guide shaft 17 and moves forward and backward. When the slider 16 moves, the spool shaft 14 and the spool 3 reciprocate forward and backward as the slider 16 so reciprocates. Fishing line that is guided from the bail 4 and the line roller 5 is uniformly wound around the outer periphery of the spool 3 forward and backward due to the rotation of the rotor 2 and forward and backward movement of the spool 3.

The rear drag mechanism 9 allows adjustment of the strength or weakness of the drag force on the spool 3 through rotation of the first and second operation members 31, 32. When the first operation member 31 on the rear portion of the reel unit 1 is tightened, the pushing portion 40 integrally formed with the first operation member 31 moves forward, and the coil spring 21 linked with the pushing portion 40 is pressed. When this occurs, the surfaces of the plurality of friction plates 19*a* of the first friction engagement portion 19 come into contact with each other, and the first flange 23 of the bush 18 is grasped by the plurality of friction plates 19*a*. Thus, by pressing on the first flange portion 23 of the bush 18, it will become difficult to rotate the spool shaft 14, since the spool shaft 14 is non-rotatably coupled with the bush 18. Accordingly, the drag force applied to the spool 3 will strengthen. On the other hand, when the first operation member 31 is loosened, the pushing portion 40 moves rearward, and the compressed state of the coil spring 21 is gradually released. When this occurs, the pressure applied to the first flange portion 23 by the friction plates 19*a* will be released. As a result, it will become easier to rotate the spool shaft 14, since the spool shaft 14 is non-rotatably coupled with the bush 18, and the drag force applied to the spool 3 will weaken.

When the second operation member 32 is tightened, the pushing member 22 moves forward along the spool shaft 14 via the engagement portion 37, which is disposed between the second operation member 32 and the pushing member 22. Due to the movement of the pushing member 22, the surfaces of the plurality of friction plates 20*a* of the second friction engagement portion 20 come into contact with each other, and the second flange portion 24 of the bush 18 is grasped by the plurality of friction plates 20*a*. Thus, by pressing on the second flange portion 24 of the bush 18, it will become difficult to rotate the spool shaft 14, which is non-rotatably coupled with the bush 18. Accordingly, the drag force applied to the spool 3 will strengthen. On the other hand, when the second operation member 32 is loosened, the pushing member 22 moves rearward along the spool shaft 14 and is pulled back and away from the second friction engagement portion 20. When this occurs, the pressure applied to the second flange portion 24 by the friction plates 20*a* will be released. Accordingly, it will become easier to rotate the spool shaft 14, which is non-rotatably coupled with the bush 18. Thus, the drag force applied to the spool 3 will weaken.

Assembly Sequence of the Screw Operation Structure

When assembling the screw operation structure 6, the first screw member 28 is first screwed rearward from the front of the outer threaded portion 27 of the screwed member 26 before mounting the screw-in portion 26 in the body 1*a* of the reel unit 1. Next, the bottom of the first operation member 31 that was formed into a closed-end cylindrical shape is faced toward the tubular portion 33, and the pushing portion 40 that was formed on the bottom of the first operation member 31 is inserted into the screw-in portion 26 while the cylindrical portion of the first operation member 31 is fitted onto the outer periphery of the first screw member 28. Then, the recessed portion 42*a* formed in the inner cylindrical surface of the first operation member 31 is fitted onto the projection 38*a* provided on the first screw member 28. Next, the second operation member 32 is fitted onto the outer threaded portion 27 side of the screw-in portion 26, and is screwed onto the front of the outer periphery of the outer threaded portion 27. Lastly, the screw-in portion 26 on which the first and second operation members 31, 32 are installed is mounted on the body 1*a* of the reel unit 1, and is bolted thereto at the positions of the bolt holes 30*a* of the projections 30 provided on the screw-in portion 26.

With the screw operation structure 6 of the present embodiment that is assembled as shown above, the screw-in portion 26 is mounted to the body 1*a* of the reel unit 1 after the first and second operation members 31, 32 are installed on the screw-in portion 26. Because of this, even if the tubular portion 33 is formed with a diameter that is larger than the inner diameter of the inner threaded portions 34*a*, 34*b* of the first screw member 28 and the second operation member 32, the first screw member 28 and the second operation member 32 can be easily mounted from the threaded portion side onto the screw-in portion 26 before the screw-in portion 26 is mounted on the body 1*a*. Accordingly, the first operation member 31 can be easily mounted to the first screw member 28 from the tubular portion 33 side without regard to whether the screw-in portion 26 is mounted to the body 1*a* because the outer shape of the first screw member 28 is formed with a diameter that is larger than the outer shape of the tubular portion 33.

On the other hand, even if the first screw member 28 and the first and second operation members 31, 32 are made such that they can be easily mounted to the screw-in portion 26, it is important to prevent the rear drag mechanism 9 from becoming disassembled, such as the first screw member 28 and/or the first and second operation members 31, 32 coming off the screw-in portion 26. In the screw operation structure 6 of the present embodiment, the tubular portion 33 of the screw-in portion 26 is formed with a diameter that is larger than the inner diameter of the inner threaded portions 34*a*, 34*b* of the first screw member 28 and the second operation member 32. Thus, the first screw member 28 and the second operation member 32 are prevented from falling off by the tubular portion 33. In addition, the first operation member 31 is non-rotatable and non-movable in the axial direction with respect to the first screw member 28 due to the recessed portion 42*a* of the first operation member 31 being fitted onto the projection 38*a* of the first screw member 28. Thus, since the first screw member 28 is prevented from falling off from the screw-in portion 26, the first operation member 31 mounted on the first screw member 28 will also be prevented from falling off from the screw-in portion 26.

Thus, with the screw operation structure 6 of the present invention, operation knobs for the rear drag mechanism 9 (the first and second operation members 31, 32 and the first screw member 28) can be easily mounted on the screwed member 26. In addition, the operation knobs can be made so that they will not fall off of the screw-in portion 26 without employing a retaining member.

Other Embodiments (a) In the aforementioned embodiment, an example was used in which the pushing portion 40 is formed integrally with the first operation member 31. However, the configuration of the first operation member 31 is not limited to that of the aforementioned embodiment, and may have any configuration so long as the first operation member 31 can be easily mounted to the screw-in portion 26. For example, the first operation member 31 may be formed separately from the pushing portion 40, and attachment bolts may be employed to attach the first operation member 31 to the separate pushing portion 40.

(b) In the aforementioned embodiment, an example was used in which the first and second operation members 31, 32 of the screw operation structure 6 are the operation knobs of the rear drag mechanism 9. However, the operation knobs are not limited to the aforementioned embodiment, and may have any configuration so long as they perform the functions of the reel unit 1.

Figure 5:
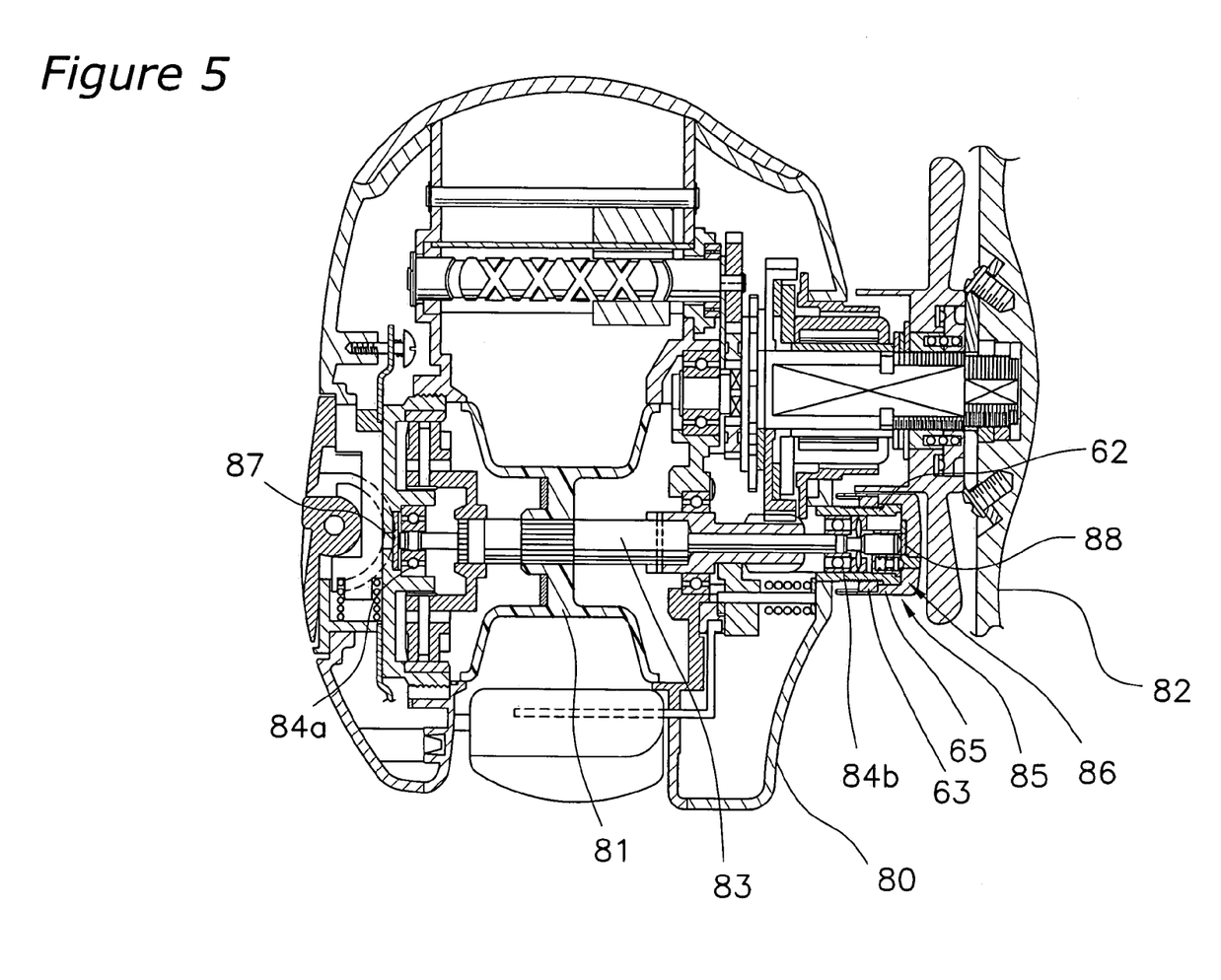
FIG. 5 is a cross sectional view of a dual bearing reel having a screw operation structure according to another embodiment of the present invention.

FIG. 5 shows a dual bearing reel having a screw operation structure in accordance with a second embodiment of the present invention. In this screw operation structure, a third screw member 63 and a third operational member 65 form an operation knot 86 of a casting control mechanism 85 of the double bearing reel. The double bearing reel shown in FIG. 5 includes a reel body 80, a spool 81 that is rotatively supported in the reel body 80, and a handle 82 that rotates the spool 81. A spool shaft 83 passes through the center of the spool 81. The spool shaft 83 is rotatively supported within the reel body 80 via bearings 84a and 84b, which are installed in the reel body 80. The casting control mechanism 85 controls the spool 81 through friction plates 87 and 88, which are disposed on either end of the spool shaft 83. The control of the casting control mechanism 85 can be adjusted by operating the operation knot 86, which is threaded into the reel body 80 and in which the friction plate 88 is installed. Since the dual bearing reel and the cast control mechanism 85 are well known in the art, their functions and structures will be clear to an ordinarily skilled in the art from this FIG. 5 and the description without any further explanation.

In this screw operation structure, a third screw member 63 and a third operation member 65 are operation knobs for a casting control mechanism in a dual bearing reel. The dual bearing reel screw operation structure shown in FIG. 6 includes a screw-in portion 62 that can be mounted on a side portion of the reel unit 80, the third screw member 63 that is formed into a cylindrical shape, and the third operation member 65 that is formed into a closed-end cylindrical shape. The screw-in portion 62 includes a threaded portion 66, and a tubular portion 67 that is integrally formed with the threaded portion 66. An inner threaded portion 68 that can be screwed onto the threaded portion 66 of the screw-in portion 62 is provided on the inner peripheral surface of the third screw member 63. In addition, a projection 70 that projects in the radial direction is formed on the outer peripheral surface of the third screw member 63. Here, the tubular portion 67 is formed such that the diameter thereof is larger than the inner diameter of the inner threaded portion 68 of the third screw member 63. A recessed portion 71 is formed in the inner circumferential surface of the cylindrical portion of the third operation member 65, and a control portion 43c is formed on the bottom of the recessed portion 71. The control portion 43c includes a projection that projects from the bottom portion of the recessed portion 71 toward the center of the third screw member 63. The recessed portion 71 of the third operation member 65 can be fitted onto the projection 70 of the third screw member 63 from the tubular portion 67 side.

Figure 6:
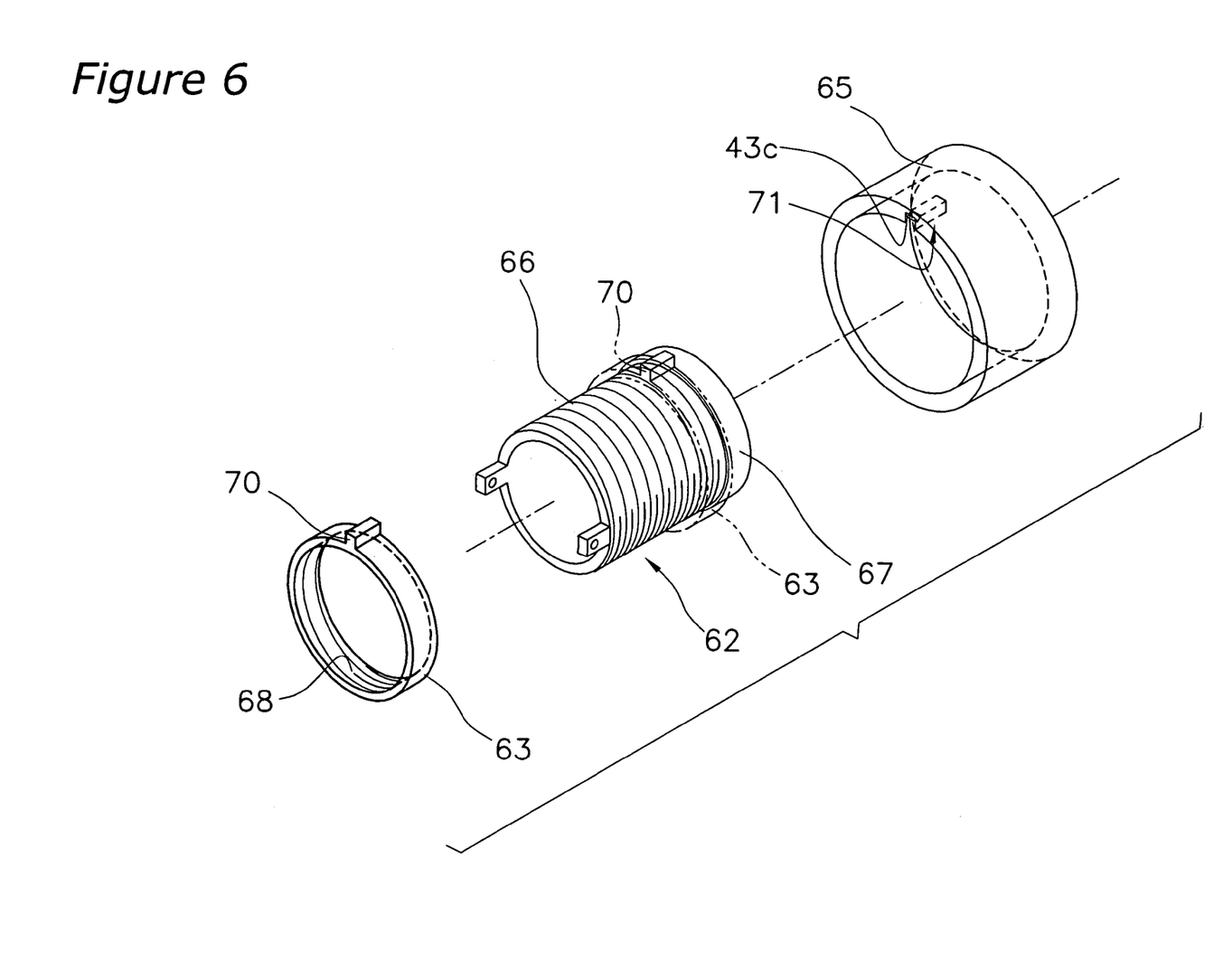
FIG. 6 is an exploded perspective view of the screw operation structure according to the second embodiment of the present invention.

With the operation knobs of the casting control mechanism of this type of dual bearing reel, the third screw member 63 can be mounted from the threaded portion 66 of the screw-in portion 62. Accordingly, the same effect as that of the aforementioned embodiment can be obtained because the third screw member 63 is prevented from falling off due to the tubular portion 67.

(c) In the aforementioned first and second embodiments, the first and third operation members 31, 65 are fixedly coupled to the first and third screw members 28, 63 by the recessed portions 42a, 71 and the control portions 43a, 43c. However, the method of fixing the first and third operation members 31, 65 is not limited to the method described in the aforementioned embodiments. For example, the first and third operation members 31, 65 may be press fitted or adhered to the first and third screw members 28, 63.

(d) In the aforementioned first and second embodiments, the first and third operation members 31, 65 are prevented from falling off of the first and third screw members 28, 63 due to the projections of the control portions 43a, 43c. However, the shapes of the control portions 43a, 43c are not limited to those of the aforementioned embodiments, and may be any shape so long as the operation member is prevented from falling off.

According to the present invention, because the screw-in portion of the screw operation structure is capable of being mounted on the reel unit, the screw member and the operation member can be easily mounted on the screw-in portion before the screw-in portion is mounted on the reel unit. In addition, the screw member can be prevented from falling off by the tubular portion after the screw-in portion is mounted on the reel unit, because the tubular portion of the screw-in portion has a diameter that is larger than the inner diameter of the threaded portion of the screw member.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-338463. The entire disclosure of Japanese Patent Application No. 2002-338463 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fishing reel screw operation structure that is adapted to be attached to a reel unit of a fishing reel, comprising:
   a screw-in portion adapted to be mounted to the reel unit, said screw-in portion having an outer threaded portion and a tubular portion that is integrally formed with said outer threaded portion; and
   a cylindrical screw member mounted to said outer threaded portion between said tubular portion and the reel unit and having an inner threaded portion on its inner peripheral surface, said inner threaded portion being configured to be screwed onto said outer threaded portion of said screw-in portion;
   said tubular portion of said screw-in portion having a diameter that is larger than an inner diameter of said inner threaded portion of said screw member.

2. The fishing reel screw operation structure set forth in claim 1, further comprising an operation member that is non-rotatably mounted to an outer peripheral surface of said screw member.

3. The fishing reel screw operation structure set forth in claim 2, wherein an outer diameter of said screw member is larger than an outer diameter of said tubular portion.

4. The fishing reel screw operation structure set forth in claim 2, wherein:

a projection projecting in a radial direction is formed on the outer peripheral surface of said screw member; and said operation member includes a recessed portion formed on its inner peripheral surface, such that said recessed portion engages with said projection of said screw member, and said operation member rotates together with said screw member.

5. The fishing reel screw operation structure set forth in claim 2, wherein said operation member is integrally formed with said screw member, said operation member having a lever that projects in a radial direction from the outer peripheral surface of said screw member.

6. The fishing reel screw operation structure set forth in claim 2, wherein said operational member is a closed-end cylindrical member.

7. The fishing reel screw operation structure set forth in claim 2, wherein:

said screw-in portion is configured to be mounted so as to project toward a rear portion of the reel unit of the fishing reel; and said operation member is an operation knob for a rear drag mechanism of the fishing reel.

8. The fishing reel screw operation structure set forth in claim 2, wherein:

said screw-in portion is configured to be mounted so as to project toward a side portion of a reel unit of a dual bearing reel; and said operation member is an operation knob for a casting control mechanism of the dual bearing reel.

9. A spinning reel, comprising:

a reel unit having a handle;

a rotor rotatively supported on a front of said reel unit;

a spool disposed on a front of said rotor so as to be movable in front and rear directions along a spool shaft, fishing line being adapted to be wound around said spool; and a screw operation structure disposed within said reel unit and including a screw-in portion mounted to said reel unit, said screw-in portion having an outer threaded portion and a tubular portion that is integrally formed with said outer threaded portion; and a cylindrical screw member mounted to said outer threaded portion between said tubular portion and said reel unit and having an inner threaded portion on its inner peripheral surface, said inner threaded portion being screwed onto said outer threaded portion of said screw-in portion;

said tubular portion of said screw-in portion having a diameter that is larger than an inner diameter of said inner threaded portion of said screw member.

10. The spinning reel set forth in claim 9, further comprising an operation member that is non-rotatably mounted to an outer peripheral surface of said screw member.

11. The spinning reel set forth in claim 10, wherein an outer diameter of said screw member is larger than an outer diameter of said tubular portion.

12. The spinning reel set forth in claim 10, wherein:

a projection projecting in a radial direction is formed on the outer peripheral surface of said screw member; and said operation member includes a recessed portion formed on its inner peripheral surface, such that said recessed portion engages with said projection of said screw member, and said operation member rotates together with said screw member.

13. The spinning reel set forth in claim 10, wherein said operation member is integrally formed with said screw member, said operation member having a lever that projects in a radial direction from the outer peripheral surface of said screw member.

14. The spinning reel set forth in claim 10, wherein said operational member is a closed-end cylindrical member.

15. The spinning reel set forth in claim 10, further comprising a cylindrical bush having a flange portion and being inserted over an outer periphery of said spool shaft; and friction plates disposed on both sides of said flange portion of said bush;

said screw-in portion being mounted so as to project toward a rear portion of said reel unit; and said operation member being configured to make said friction plates come into contact with each other.

16. The spinning reel set forth in claim 15, further comprising a coil spring disposed on the outer periphery of said spool shaft for urging said friction plates; and a pushing portion that is integrally formed with said operation member and is linked with said coil spring, such that said coil spring is pressed when said operation member is operated.

* * * * *